US007045779B2

(12) United States Patent
Davis

(10) Patent No.: US 7,045,779 B2
(45) Date of Patent: May 16, 2006

(54) METHOD AND APPARATUS FOR ANALYZING HYDROCARBON STREAMS

(75) Inventor: Dean Vinson Davis, Bartlesville, OK (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/093,366

(22) Filed: Mar. 30, 2005

(65) Prior Publication Data

US 2005/0167586 A1 Aug. 4, 2005

Related U.S. Application Data

(62) Division of application No. 10/717,833, filed on Nov. 20, 2003, now Pat. No. 6,984,820.

(51) Int. Cl.
*B01D 59/44* (2006.01)
*H01J 49/00* (2006.01)

(52) U.S. Cl. ...................... 250/291; 250/290; 250/281; 250/283; 250/286; 250/288

(58) Field of Classification Search ..................... None
See application file for complete search history.

(56) References Cited

U.S. PATENT DOCUMENTS 5,285,064 A * 2/1994 Willoughby ................ 250/288
5,608,216 A * 3/1997 Wells et al. ................ 250/282

* cited by examiner

*Primary Examiner*—Nikita Wells

(57) ABSTRACT

The present invention is a method and apparatus for identifying a mixture of particles using a Fourier transform ion cyclotron resonance mass spectrometer (FT-ICR MS). The particles are first reacted in a charge exchange reaction within the FT-ICR MS chamber using ionic partners that are chosen to discriminate among components of the mixture based on ionization potential. Mass spectra of test runs using different ionic partners may then be compared to identify components based on information gathered about both molecular mass and ionization potential.

11 Claims, 6 Drawing Sheets

AVERAGE IP

METHOD AND APPARATUS FOR ANALYZING HYDROCARBON STREAMS

This is a divisional application of Ser. No. 10/717,833 filed on Nov. 20, 2003, now U.S. Pat. No. 6,984,820.

FIELD OF THE INVENTION

The present invention relates generally to the field of mass spectrometry, and more particularly, to a method and apparatus for using charge exchange reactions in conjunction with mass spectrometry for analyzing and quantifying multiple compounds of similar molecular weight contained in a mixture.

BACKGROUND OF THE INVENTION

Mass spectrometry is a powerful analytical tool used in the identification of unknown compounds and elements. The technique measures the mass-to-charge ratio (m/z) of individual ionized molecules. Because the charge of those ions is usually known (and is usually plus or minus z, the charge of one electron), the mass of the ion may be deduced, and the molecule may be generally identified.

A functional block diagram of a modem mass spectrometer 100 is shown in FIG. 1. An inlet 110 provides a location for introduction of a sample. The inlet may be configured to accept a solid, a liquid or a gas. The inlet is equipped to permit introduction of the sample into a vacuum chamber 150 that is kept evacuated using vacuum pumps 118.

The sample passes into an ion source 112 that provides the charged molecular particles that are to be detected. In a commonly-used source known as an electron ionization (EI) source or electron impact source, ions are generated by bombarding a gaseous sample with a beam of energetic electrons. Solids and liquids may first be vaporized by evaporation or sublimation, then subject to EI. While the EI process is simple, it can result in the decomposition of the molecules to be tested. It is then necessary to indirectly deduce the original composition of the sample, often with ambiguous results.

A number of lower energy or “soft” ionization techniques have been developed based on chemical or desorption ionization. Chemical ionization produces ions by the relatively low energy process of proton transfer. The sample molecules are exposed to a large excess of ionized reagent gas, and protons are transferred from the reagent to the sample molecules to produce positive ions. Negative ions have also been produced by transferring a proton from the sample molecule to the reagent. Low energy electrons have also been added to sample molecules by collisionally reducing the energy of the electrons generated in the source.

Desorption ionization is a process by which a molecule is both evaporated from a surface and ionized. The process may involve bombarding the surface with high energy particles or subjecting the surface to a high intensity electric field.

The ions produced by the ion source 112 are separated by an analyzer 114 where the ions are sorted according to their mass-to-charge ratio. The sorted ions are then processed by a detector 116, where ion flux is converted into a proportional electrical current. That electrical current is recorded and analyzed by a data processing system 120 that contains analysis algorithms for producing mass spectra data outputs 122.

Several techniques have evolved for sorting and detecting ions in a modern mass spectrometer. The most widely used of those techniques include magnetic sector analyzers, quadrupole mass filters, quadrupole ion traps, Fourier transform ion cyclotron resonance spectrometers and time-of-flight mass analyzers. Of those techniques, a well-designed Fourier transform ion cyclotron resonance mass spectrometer (FT-ICR MS) provides extremely high resolution for relatively low cost.

Most mass spectrometers operate by altering the trajectory of an ion in a magnetic field. The new trajectory depends on properties related to the mass-to-charge ratio of the ion; i.e., at a given velocity, the trajectory of a more massive ion is altered less than that of a less massive ion. By subjecting ions of differing m/z to a fixed magnetic field, those ions may be separated for detection and analysis.

A cell or chamber 200 of a typical FT-ICR MS, shown in partial section in FIG. 2, includes a group of plates 211–216 surrounding a roughly cubic cell 225. Ions may either be generated externally and introduced along path 250, or are generated within the cell. The ions are trapped electrostatically in a homogeneous magnetic field 220. The ions orbit around the field lines in orbits 230. Trapping plates 215, 216 keep the ions from spreading along the field lines.

The orbital motion 230 is induced by applying an RF pulse to the excitation plates 213, 214. Ions having a particular mass are excited by a particular resonant frequency, with less massive ions having a higher resonant frequency and more massive ions having a lower resonant frequency. In practice, a short RF pulse containing a specific group or range of frequencies is applied across the excitation plates 213, 214 to move all the ions sequentially.

As the ions are excited by their respective resonant frequencies, the orbit 230 of those ions enlarges, bringing them in proximity with the detection plates 211, 212. The ions induce a faint signal across the plates, which is received and analyzed by data system 120 (FIG. 1). Alternatively, the orbit of selected ions can be enlarged to a diameter that exceeds the dimensions of the cell by increasing the amplitude of the signal at the resonant frequency. This process, known as ejection, brings the selected ions outside the cell where they are eliminated by the vacuum pump. The ejection process is used to eliminate ions of chosen m/z to improve the detection limit of other ions, particularly when the concentration of the ejected ions is large compared to that of the ions of interest. For example, ejection may be used in detecting gasses in trace amounts with hydrogen.

The electronics 300 of an FT-ICR MS, shown as a simplified schematic in FIG. 3, includes detection electronics 310, excitation electronics 350 and a computer control 380. The excitation electronics 350 includes a digital signal processor (DSP) 352 controlling a digital to analog converter (DAC) 354. The output from the DAC 354 is filtered by filter 356 to remove unwanted signal components. The DSP 352, DAC 354 and filter 356 are used in existing FT-ICR MS equipment for the excitation and ejection of particles having a moderate to large molecular mass. The DAC 354 is controlled to generate a waveform containing the resonant frequencies used to excite or eject components that have masses corresponding to those resonant frequencies. An arbitrary waveform generator 358 is alternatively used in some applications. In either case, the waveform is applied across the excitation plates 213, 214 of the FT-ICR MS cell 200.

Detection electronics 310 receive the resulting signal from the detection plates 211, 212. An analog-to-digital converter (ADC) 317 converts the analog signal to a digital signal, which is processed by the DSP 315.

Process control electronics 386 send signals to control elements of the test equipment such as process valving and vacuum pumps, shown schematically as a single element 385. In that way the timing and sequence of events in the test process can be closely controlled.

The excitation electronics 350, detection electronics 310 and process control electronics 386 are controlled by a computer control 380. The computer control 380 executes instructions for initiating and operating the excitation and detection electronics 350, 310 and performing the Fourier transformations, as well as initiating and operating the process control electronics, and stores data for running particular routines involving those components. The computer control also stores and performs analysis of data received from the detection electronics 310.

Because the basic principles used in mass spectroscopy separate ions based on their mass-to-charge ratio, the technique is inherently limited in cases where the sample mixture contains compounds having similar atomic masses. For example, in the case of a hydrocarbon mixture in which isomers such as butene and cyclobutane are present, those compounds cannot be distinguished based solely on mass, because both have compositions $C_4H_8$ and atomic weights of 56. Yet, because of the markedly different physical properties of those two isomers, it is often important to quantify their presence in a hydrocarbon mixture.

One approach to that problem is the coupling of gas chromatography (GC) to mass spectrometry. That connection allows compounds already in the vapor phase to enter the mass spectrometer separated in time so that the components of mixtures can be detected and analyzed sequentially. More recently, liquid chromatographs, supercritical fluid chromatographs, and capillary electrophoresis devices connected to mass spectrometers have been used to separate components of complex mixtures prior to mass analysis. The use of those techniques, however, it often extremely time consuming. For that reason, those techniques cannot be used on-line for real-time process control. Furthermore, those techniques, when coupled to mass spectrometry, often do not yield reliable quantification of the mixture components. That limitation also makes chromatography only marginally useful in on-line applications.

Charge exchange reactions are known. In a charge exchange reaction, an ionic reagent having an ionization potential x is associated with a sample compound having an ionization potential y where $x>y$. Because the energy released by neutralizing the reagent is greater than the energy required to ionize the sample, the reaction is exothermic. In a sample containing compounds having various ionization potentials, compounds that have an ionization potential greater than x are not ionized.

Charge exchange reactions have been described in connection with gas chromatography and mass spectroscopy. One such description is by Brian Wagner, Gordon Nicol & Burnaby Munson, "Fast Quantitation of BTEX and Total Aromatics in Petroleum Products by GC/CIMS," 1999 ASMS Conference Proceedings. The authors disclose the use of a low energy charge exchange reaction as a method for selective ionization of the aromatic components in petroleum products. The charge exchange reaction is coupled with gas chromatography to selectively produce ions that are then introduced into the analyzer and detector cells of a quadrupole mass spectrometer. Cycle time is said to be reduced to about 15 minutes. Such a cycle time still far exceeds that required for on-line, real time process control.

There is therefore presently a need to provide a method and apparatus for the on-line detection and accurate quantization of multiple isomers in a mixture. Particularly, there is a need for a technique for use with a FT-ICR mass spectrometer that permits the discrimination of isomers without a great increase in cycle time. The technique should preferably be implemented with a minimum of additional cost. To the inventor's knowledge, there is currently no such technique available.

SUMMARY OF THE INVENTION

The present invention addresses the needs described above by providing a method for identifying components of a sample mixture in a Fourier transform ion cyclotron resonance mass spectrometer (FT-ICR MS) having a FT-ICR MS chamber. The components have respective ionization potentials defining a range of ionization potentials.

The method includes the steps of selecting a first ionic partner having an ionization potential within the range of ionization potentials, introducing the first ionic partner into the FT-ICR MS chamber, introducing the sample mixture into the FT-ICR MS chamber, whereby a charge exchange reaction takes place in the chamber between the first ionic partner and those components of the sample mixture having ionization potentials below the ionization potential of the first ionic partner, forming a first ionized mixture, and detecting the ionized components of the first ionized mixture in the FT-ICR MS chamber.

The ionization potential of the first ionic partner may be about 9.3 electron volts, and may be an ionized gas selected from the group consisting of pyridine, nitrogen oxide and 1,2 difluorobenzene. The first ionic partner may be introduced by bombarding a neutral reagent gas with electrons within the chamber.

The sample mixture may be introduced into the FT-ICR MS chamber and the charge exchange reaction may take place at a pressure of less than $10^{-6}$ torr. The detection step may take place in the FT-ICR MS chamber at a pressure less than $10^{-9}$ torr.

The method may further include the steps of selecting a second ionic partner having an ionization potential greater than that of the first ionic partner, introducing the second ionic partner into the FT-ICR MS chamber, and introducing the sample mixture into the FT-ICR MS chamber, whereby a charge exchange reaction takes place in the chamber between the second ionic partner and those components of the sample mixture having ionization potentials below the ionization potential of the second ionic partner, forming a second ionized mixture. The ionized components of the second ionized mixture are then detected in the FT-ICR MS chamber, and results obtained in the detection of the ionized components of the first and second ionized mixtures are compared.

The ionization potential of the second ionic partner may be greater than about 14 electron volts, and the second ionic partner may be selected from the group consisting of CO, N2 and SiF4. The second ionic partner may have an ionization potential greater than that of each of the components of the sample mixture.

The step of comparing results obtained in the detection of the ionized components of the first and second ionized mixtures may include using results obtained in the detection of the ionized components of the first ionized mixture, to identify components appearing in the results obtained in the detection of the ionized components of the second ionized mixture.

The step of comparing results may include identifying a component of the mixture based on information from the results from the detection steps and using an ionization potential of the component.

In another embodiment of the invention, an apparatus is provided for identifying components of a sample mixture. The components have respective ionization potentials defining a range of ionization potentials.

The apparatus comprises a chamber, and at least one inlet and sample injection valve connected to the chamber for introducing pulses of the sample mixture and of first and second reagent gasses. The apparatus further includes excitation plates in the chamber for inducing orbital motion of ionized components within the chamber, detecting plates for detecting the ionized components in the chamber, and an electron source for directing electrons into the chamber.

The apparatus also comprises a controller configured to control the sample injection valve, the excitation plates, the detection plates and the electron source. The controller includes a memory with executable instructions for performing the steps of introducing a pulse of first reagent gas through the inlet, ionizing the first reagent gas by actuating the electron source; admitting a pulse of the sample mixture, inducing an orbital motion with the excitation plates and detecting orbiting molecules, and repeating the steps using the second reagent gas.

The ionization potential of the first reagent gas may be about 9.3 electron volts, and the reagent gas may be selected from the group consisting of pyridine, nitrogen oxide and 1,2 difluorobenzene.

The apparatus may further comprise a vacuum pump connected to the chamber. In that case, the executable instructions further include the step of controlling the vacuum pump to introduce the sample mixture into the chamber at a pressure less than $10^{-6}$ torr. The executable instructions may alternatively or additionally include the step of controlling the vacuum pump such that the orbiting molecules are detected at a pressure less than $10^{-9}$ torr.

The ionization potential of the second reagent gas may be greater than about14 electron volts, and may be selected from the group consisting of CO, N2 and SiF4. The second reagent gas may have an ionization potential greater than that of each of the components of the sample mixture.

The executable instructions may further include the step of comparing results obtained in the detection of the orbiting molecules produced with the first reagent gas with those produced with the second reagent gas. The step of comparing results obtained in the detection of the orbiting molecules produced with the first and second reagent gasses may include using results obtained in the detection of the orbiting molecules produced with the first reagent gas, to identify components appearing in the results obtained in the detection of the orbiting molecules produced with the second reagent gas. The step of comparing results may include identifying a component of the mixture based on information from the results from the detection steps and using an ionization potential of the component.

DESCRIPTION OF THE INVENTION

Figure 1:
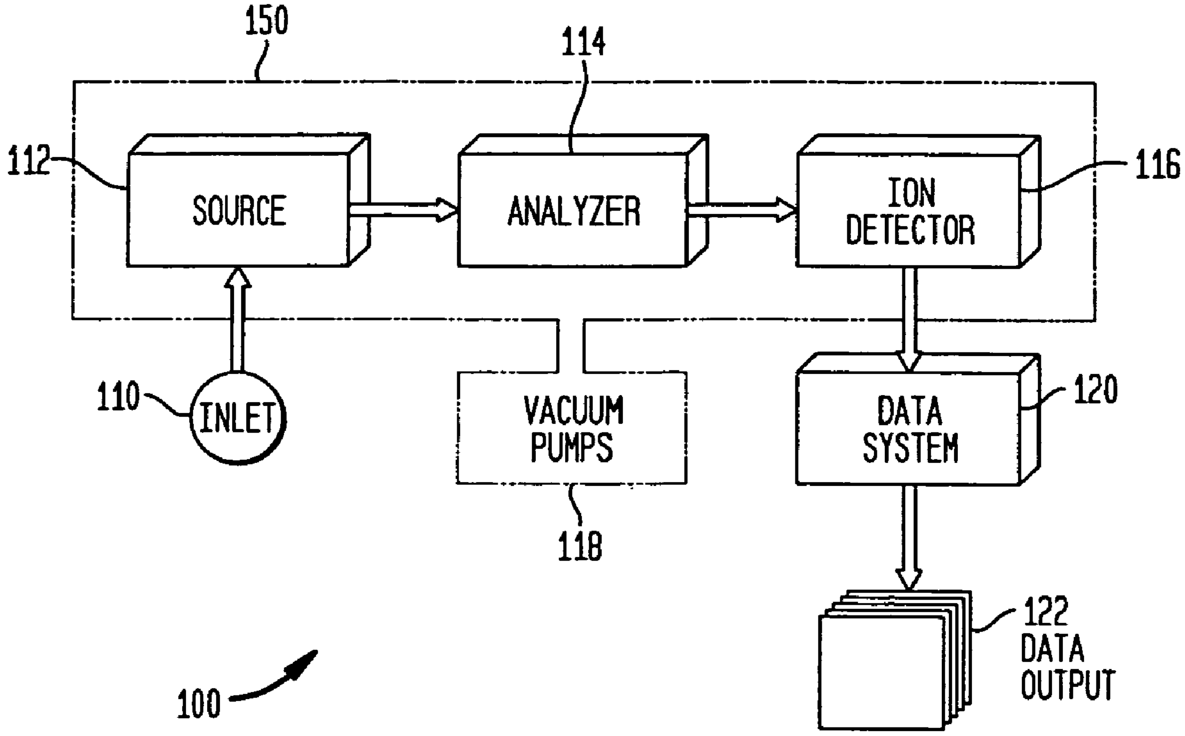
FIG. 1 (PRIOR ART)
FIG. 1 is a block diagram showing the functional elements of a mass spectrometer.
Figure 2:
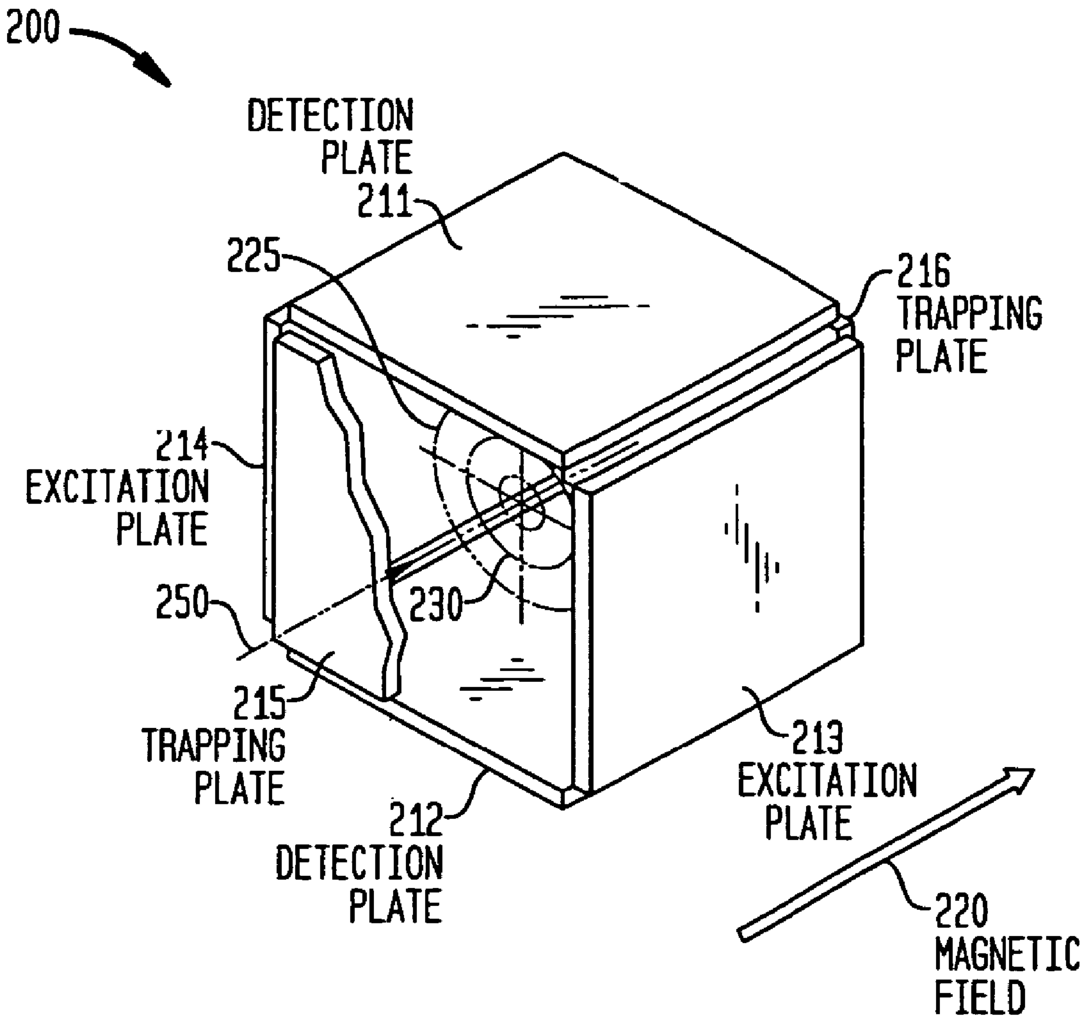
FIG. 2 (PRIOR ART)
FIG. 2 is a schematic diagram of the analyzer and ion detector cell elements of an FT-ICR MS.
Figure 3:
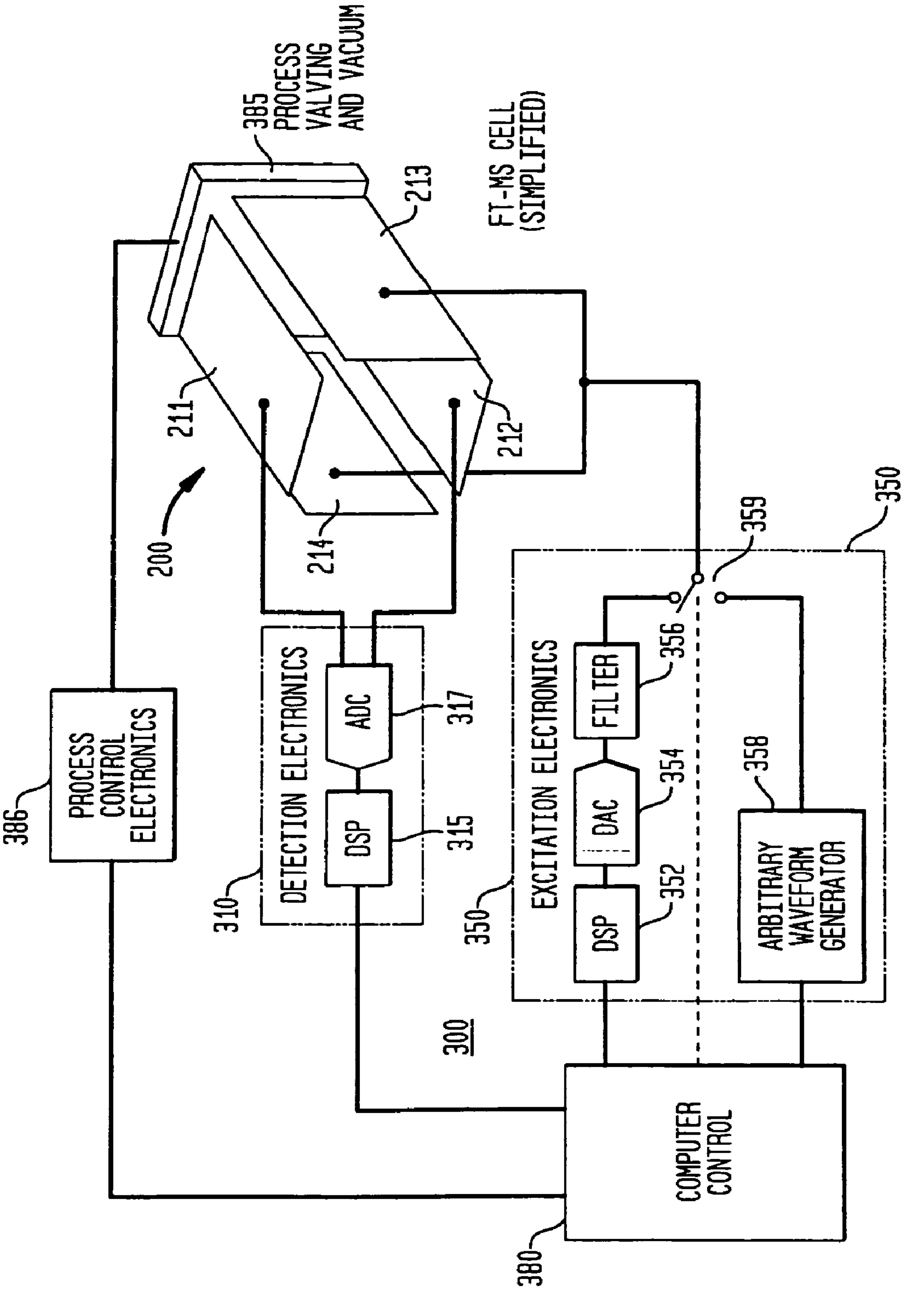
FIG. 3 (PRIOR ART)
FIG. 3 is a schematic diagram of the analyzer and ion detector electronics of an FT-ICR MS.

The method and apparatus of the present invention permit the discrimination of molecules having similar molecular weights for detection and quantitization using FT-ICR mass spectroscopy. The method may be performed in an FT-ICR MS chamber with little or no modification. The method permits on-line analysis of olefins and other compounds in hydrocarbon streams that also contain isomers of those compounds.

The present invention utilizes the selectively exothermic nature of charge exchange reactions as a means for measuring particular species in mixed hydrocarbon streams. Charge exchange reactions are those in which an ionic species reacts with a neutral species, wherein the neutral species is ionized and the ionic species is neutralized. The energetics of such charge exchange reactions are a function of the difference in energy between the ionization potentials of the species involved. When the energy released by the neutralization process is greater than the energy required by the ionization process, the reaction is exothermic.

FT-ICR mass spectrometry is unique among the various techniques employed in mass sprectrometry because there is no additional source of energy which can be used to drive reactions that are not exothermic; therefore, non-exothermic reactions will simply not occur in the FT-ICR MS chamber.

The method of the present invention utilizes that characteristic of FT-ICR MS by carefully selecting an ionic partner of a charge exchange reaction to take place within the FT-ICR MS cell. In that way, only certain materials of the sample mixture having ionization potentials up to a strictly defined limit are selectively ionized. For example, in the case of hydrocarbons, the chemistry is such that aromatic materials have lower ionization potentials, followed by olefinic materials, then paraffinic materials, which have higher ionization potentials. By careful selection of a series of two or more charge exchange gasses, it is possible to first ionize only the olefinic+aromatic materials, and finally all hydrocarbon materials. The results of those successive ionization reactions can be used to provide quantitative information with regard to hydrocarbon class.

The method includes preparing an ionic partner for the charge exchange reaction by ionizing a single species with a well-defined ionization potential (IP). In one embodiment of the invention, that preparation is carried out by electron ionization (EI) within the FT-ICR MS chamber. The EI process forms an ionic partner M with a known charge exchange behavior. That behavior is known because a charge exchange reaction of M with a component species N in a sample, can take place only if that reaction is exothermic. That is, in the following reaction $$M^{+}+N \rightarrow M+N^{+}$$

if the ionization potential of M is less than that of N, then N remains neutral, but if the ionization potential of N is less than that of M then charge exchange takes place.

In the method of the present invention, that selective nature of the charge exchange reaction is utilized to discriminate among species having similar molecular weights.

Figure 4:
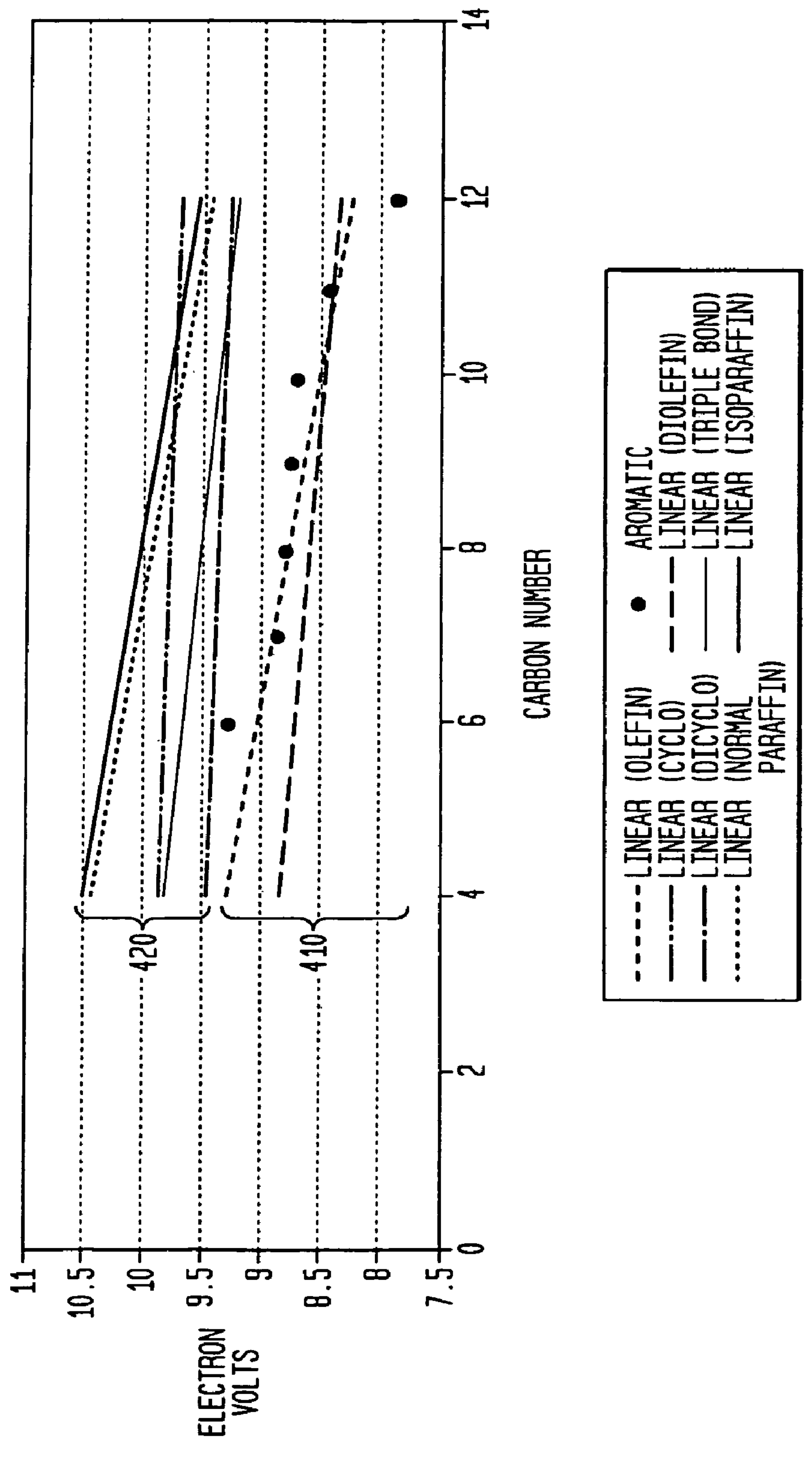
FIG. 4 is a chart showing the ionization potentials of several hydrocarbon groups as a function of carbon number.

FIG. 4 is a plot of ionization potentials of common hydrocarbons from C4 to C12, as a function of carbon number. After C12 the IP's are essentially constant. From that plot there can readily be seen two groups of hydrocarbons: species 410 with IP's below 9.3 eV (aromatics, olefins, and diolefins) and species 420 with IP's above 9.3 (paraffins, cycloparaffins, and alkynes). Thus, choosing an ionic partner with an IP of approximately 9.3 permits clear differentiation between those two classes. Possible candidates for such an ionic partner include pyridine (9.26 eV), NO (9.26 eV), and 1,2 difluorobenzene (9.29 eV). In a charge exchange reaction using one of those ionic partners, only members of the first group of hydrocarbons (aromatics, olefins, and diolefins) will form ions and only members of that group will be detected in an FT-ICR MS chamber. After calibration, quantitation of those ions can be performed, and an olefin and aromatic content of the sample hydrocarbon stream can be determined.

A second charge exchange reaction, using an ionic partner with an IP>14 eV will ionize all the species in the hydrocarbon stream. Candidates for the second ionic partner include CO (14.01 eV), N2 (15.58 eV) and SiF4 (15.24 eV). After experiments involving both charge exchange reactions are run, species in the second group of hydrocarbons (paraffins, cycloparaffins, and alkynes) present in the mixture can be determined by observing differences between the first and second experiments in the quantities of species having specific molecular weights.

Figure 5:
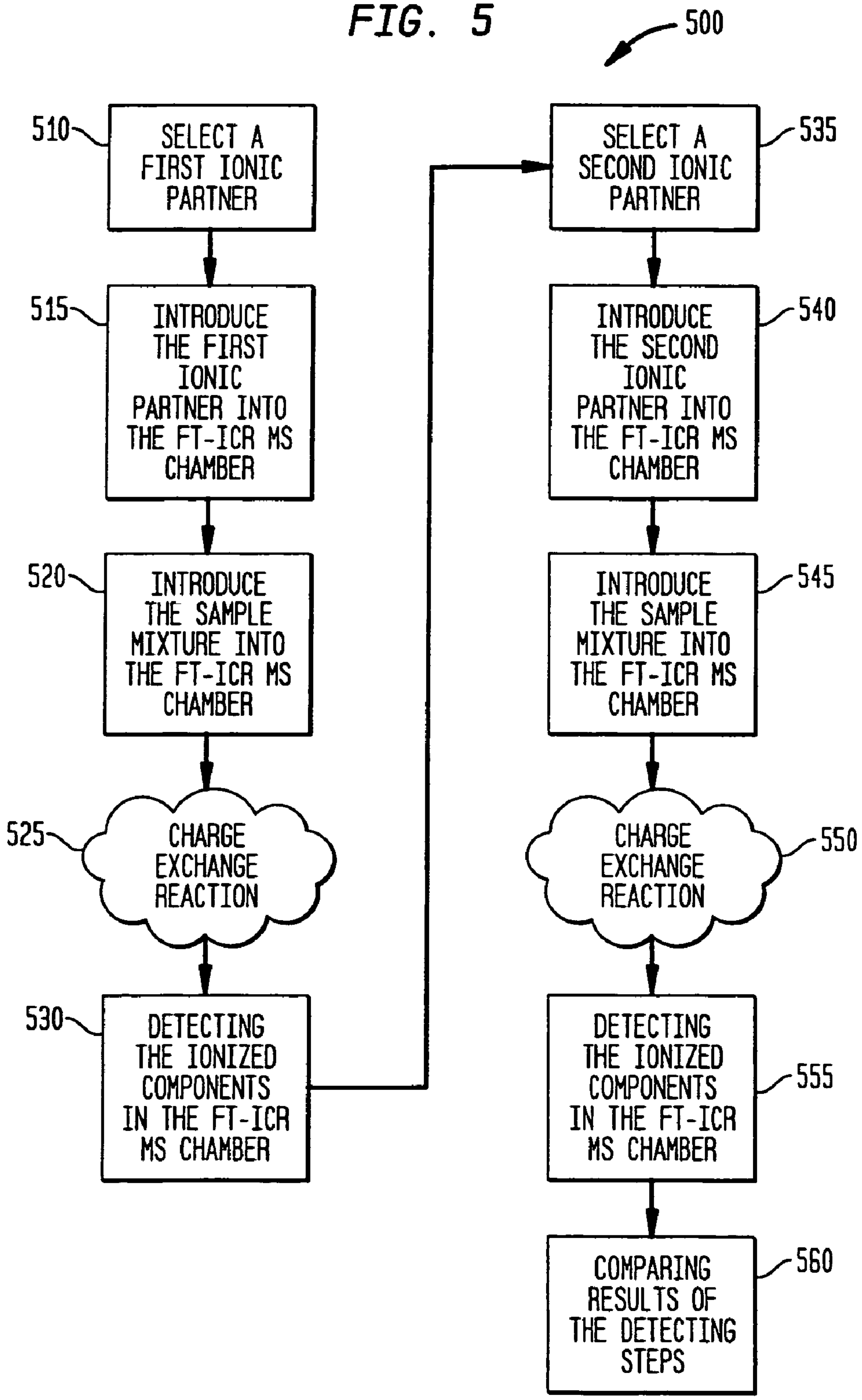
FIG. 5 is a block diagram showing a method according to one embodiment of the invention.

A method 500 for performing the above-described experiments is shown in block diagram form in FIG. 5. The following description of that method includes currently preferred cycle times and pressures. That data is specific for the exemplary embodiment described herein using a hydrocarbon gas sample. One skilled in the art will recognize that such data depend upon the exact sample to be analyzed, the particular MS cell used and many other factors. The presentation of that data herein is illustrative, and is not intended to limit the scope of the invention.

A first ionic partner is selected (step 510) based on its IP. Where olefins and paraffins must be separated and quantified in a hydrocarbon mixture, the first ionic partner preferably has an IP of about 9.3. One skilled in the art will recognize that a first ionic partner having a different IP is appropriate for other mixtures.

The first ionic partner is then introduced (step 515) into the FT-ICR MS chamber. In a preferred embodiment, introducing the first ionic partner includes admitting a 1 millisecond pulse of the neutral of that ion at a pressure less than $10^{-6}$ torr, and preferably about $10^{-7}$ torr. The neutral ion is then ionized using EI for about 50 milliseconds at the same pressure. Non-ionized gas molecules are then pumped out, taking about 100 milliseconds and lowering the pressure to about $10^{-10}$ torr. The ions present in the chamber are trapped there by the chamber's magnetic and electric fields.

A 1 millisecond pulse of the sample gas is then introduced (step 520) into the FT-ICR MS chamber at $10^{-7}$ torr. The charge exchange reaction is then permitted (step 525) at that low pressure, without the presence of any extraneous ions or neutral molecules. Because no heat, kinetic energy or any other energy is available during the reaction, only the exothermic charge exchange reaction takes place. Molecules having an IP greater than that of the first ionic partner are not ionized. The non-ionized gas molecules are again pumped out, taking about 100 milliseconds and lowering the pressure to about $10^{-10}$ torr. Ions remain in the chamber because they are trapped by the magnetic and electric fields.

The excitation plates of the FT-ICR MS are then activated, and the ionized molecules remaining in the chamber are detected (step 530) using the detection plates. Detection takes place at about $10^{-10}$ torr and takes about 100 milliseconds.

In cases where it is desired to perform a second experiment to detect those components having a higher IP, the chamber is cleared of all ions and the steps are repeated using a second ionic partner having an IP greater that all components to be detected. The second ionic partner is selected (step 535) and introduced (step 540) into the FT-ICR MS chamber. Another pulse of the sample is introduced (step 545) and the charge exchange reaction takes place (step 550). The ionized components are then detected (step 555). Depending on the IP of the second ionic partner, the detected ionized components may include all components of the sample mixture.

The results of the first and second detection steps are then compared (step 560). By subtracting peaks appearing at the same molecular weight in the two spectra, the presence of isomers may be quantified.

The process steps described above may be performed by executing instructions stored in a computer readable medium. The computer readable medium comprises any medium that participates in submitting instructions to a processor. For example, the instructions may be temporarily stored in a volatile, non-removeable random-access memory (RAM) within the computer control, and transferred from the RAM to a processor for execution. Further, the instructions may be stored in non-volatile memory available for reading into RAM or for direct execution by the processor. Examples of non-volatile memory include removable or non-removable read-only memory (ROM), flash memory cards (flash RAM), magnetic media such as fixed disks, floppy disks and magnetic tape, and optical media such as optical disks using CD and DVD formats.

Figure 6:
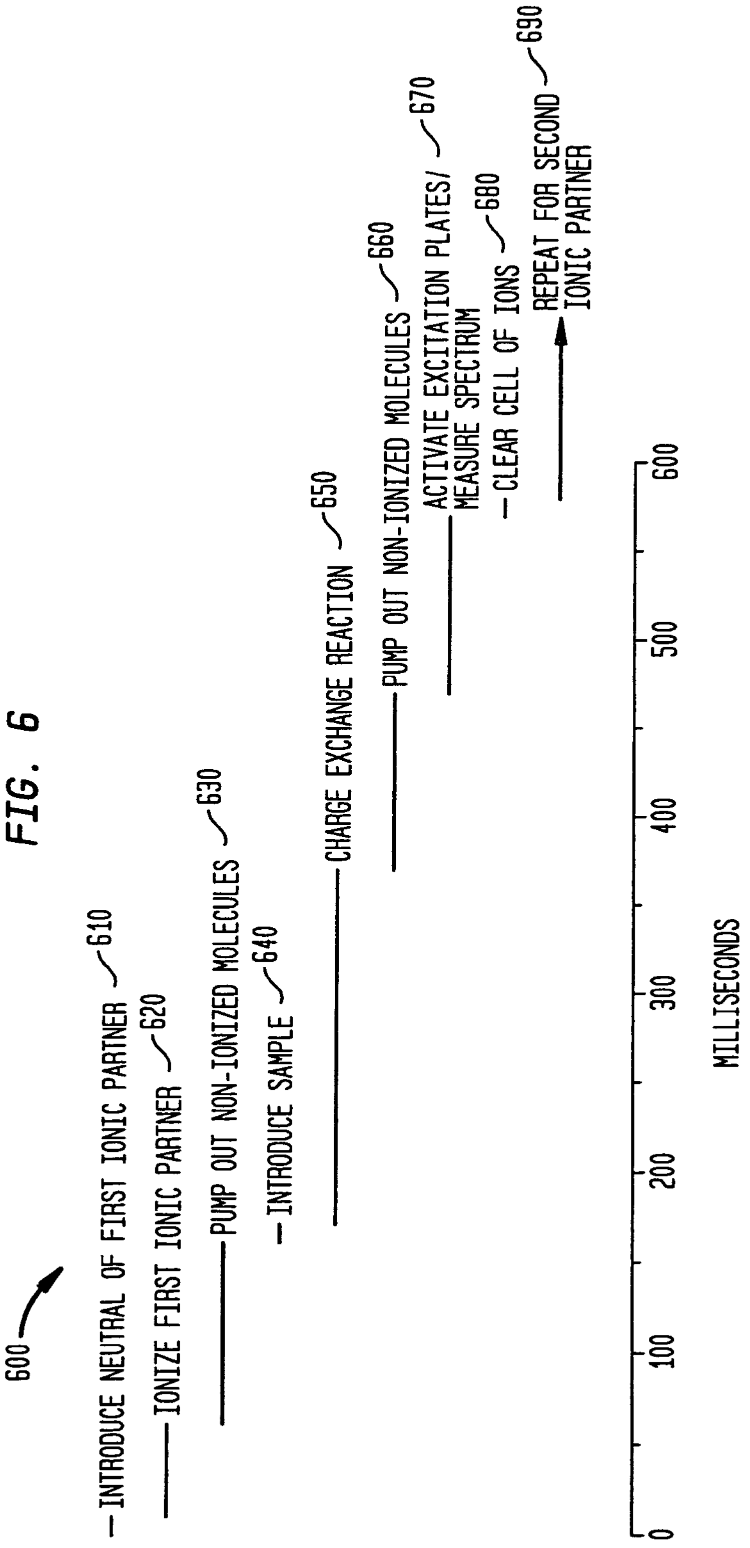
FIG. 6 is a timing chart showing a process according to one embodiment of the invention.

A timeline 600 showing the sequence of steps in the above-described process is shown in FIG. 6. A 1 millisecond pulse (interval 610) of the neutral first ionic partner is initially introduced into the chamber. That reagent is ionized (620) for 50 ms and the chamber is pumped out (630) for 100 ms to remove non-ionized molecules.

The sample is introduced (640) in a 1 millisecond pulse, and the charge exchange reaction (650) is permitted to take place for between 20 and 200 milliseconds. Non-ionized molecules are pumped out (660) for 100 milliseconds. The excitation plates are activated, and the mass spectrum is detected and recorded (670), taking about 100 milliseconds. The cell is then cleared of ions (680) and the process is repeated (690) for the second charge exchange reagent.

As can be seen from the timeline 600, one cycle may be completed in less than 600 milliseconds. A two-step charge exchange/MS experiment may therefore take less than two seconds, and preferably less than one second, excluding the coadding of multiple experiments and any set-up and analysis time. The method of the invention is therefore fast enough to be used on line. For example, the method may be used on line to provide process control information in the refinement of crude oil.

In one example experiment according to the invention, a gasoline sample is analyzed using difluorobenzene as the first ionic partner as follows:

(1) Introduce into the instrument a pulse of the difluorobenzene and ionize it. A single intense peak at m/z=114 will be formed.

(2) Introduce into the instrument a pulse of gasoline. The neutral gasoline molecules will react with the difluorobenzene ions only if the reaction is exothermic. Those reactions will form molecular ion peaks of the various olefins present at m/z=28, 42, 56, etc. The sum of those peaks is a measure of the olefin content and the relative intensities of those peaks represent the carbon number distribution of the olefins. In order to determine the absolute olefin content, the system must have been previously calibrated with a series of samples of known olefin content. The aromatic materials will also react with the difluorobenzene ions to form a series of peaks at m/z=78, 92, 106, etc. Those peaks will represent the various alkyl substituted monoaromatic species. A series of peaks at m/z=128, 142, 156 will also form representing the diaromatic species present.

The diolefins, which will be minor components, will form a series of peaks at m/z=26, 40, 54. No other hydrocarbons will be ionized.

(3) Introduce into the instrument a pulse of CO. That will form a large peak at m/z=28.

(4) Introduce into the instrument a pulse of gasoline. The neutral gasoline molecules will react with the CO ions only if the reaction is exothermic. Those reactions will form molecular ions at the same masses as above plus greater intensity peaks at m/z=28, 42, 56, etc. due to cyclic species. The sum of those peaks minus the previous sum of the olefins is a measure of the cyclic (napthene) content, and the relative intensities of those peaks represent the carbon number distribution of the cyclic hydrocarbons. In order to determine the absolute cyclohydrocarbon content the system must be previously calibrated with a series of samples of known cyclohydrocarbon content. In addition to the above-mentioned peaks, a new series of peaks will be formed at m/z=30, 44, 58, etc. due to the presence of paraffinic materials. Those peaks can also be used to measure concentrations.

Thus in step (2) the olefin and aromatic content was determined, while in step (4) the paraffin and napthene content was measured. When those experiments are performed together they can provide an analysis of paraffin/olefin/napthene/aromatic (PONA) content using an on-line FT-ICR MS. The entire experiment only takes about 1 minute including coadding of multiple experiments, set-up time and analysis. The method is therefore much more rapid than determining those values by either laboratory or on-line gas chromatography means.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the analysis method is described primarily in connection with hydrocarbon mixtures, the technique of the invention may be used with any mixture containing molecules having similar molecular weight, while remaining within the scope of the invention. It is to be understood that the embodiments shown and described herein are only illustrative of the principles of the present invention and that various modifications may be implemented by those skilled in the art without departing from the scope and spirit of the invention.

What is claimed is:

1. An apparatus for identifying components of a sample mixture, the components having respective ionization potentials defining a range of ionization potentials, the apparatus comprising:

a chamber;

at least one inlet with a sample injection valve opening to the chamber for introducing pulses of the sample mixture and of first and second reagent gasses;

excitation plates in the chamber for inducing orbital motion of ionized components within the chamber;

detecting plates for detecting the ionized components in the chamber;

an electron source for directing electrons into the chamber;

a controller configured to control the sample injection valve, the excitation plates, the detection plates and the electron source; the controller including a computer readable medium with executable instructions for performing the steps of introducing a pulse of first reagent gas through the inlet, ionizing the first reagent gas by actuating the electron source; admitting a pulse of the sample mixture through the inlet and ionizing the sample mixture through a charge exchange reaction with the ionized reagent gas, inducing an orbital motion with the excitation plates and detecting orbiting molecules with the detection plates, and repeating steps using the second reagent gas.

2. The apparatus of claim 1, wherein the ionization potential of the first reagent gas is about 9.3 electron volts.

3. The apparatus of claim 2, wherein the first reagent gas is selected from the group consisting of pyridine, nitrogen oxide and 1,2 difluorobenzene.

4. The apparatus of claim 1, wherein the executable instructions further include the step of controlling a gas introduction pulse size of the sample injection valve to introduce the sample mixture into the chamber at a pressure less than 10–6 torr.

5. The apparatus of claim 1, wherein the executable instructions further include the step of controlling a gas introduction pulse size of the sample injection valve such that the orbiting molecules are detected at a pressure less than 10–9 torr.

6. The apparatus of claim 1, wherein the ionization potential of the second reagent gas is greater than about 14 electron volts.

7. The apparatus of claim 6, wherein the second reagent gas is selected from the group consisting of CO, N2 and SiF4.

8. The apparatus of claim 1, wherein the second reagent gas has an ionization potential greater than that of each of the components of the sample mixture.

9. The apparatus of claim 1, wherein the executable instructions further include the step of comparing results obtained in the detection of the orbiting molecules produced with the first reagent gas with those produced with the second reagent gas.

10. The apparatus of claim 9, wherein the step of comparing results obtained in the detection of the orbiting molecules produced with the first and second reagent gasses includes using results obtained in the detection of the orbiting molecules produced with the first reagent gas, to identify components appearing in the results obtained in the detection of the orbiting molecules produced with the second reagent gas.

11. The apparatus of claim 9, wherein the step of comparing results includes identifying a component of the mixture based on information from the results from the detection steps and using an ionization potential of the component.

* * * * *